Figure 1:
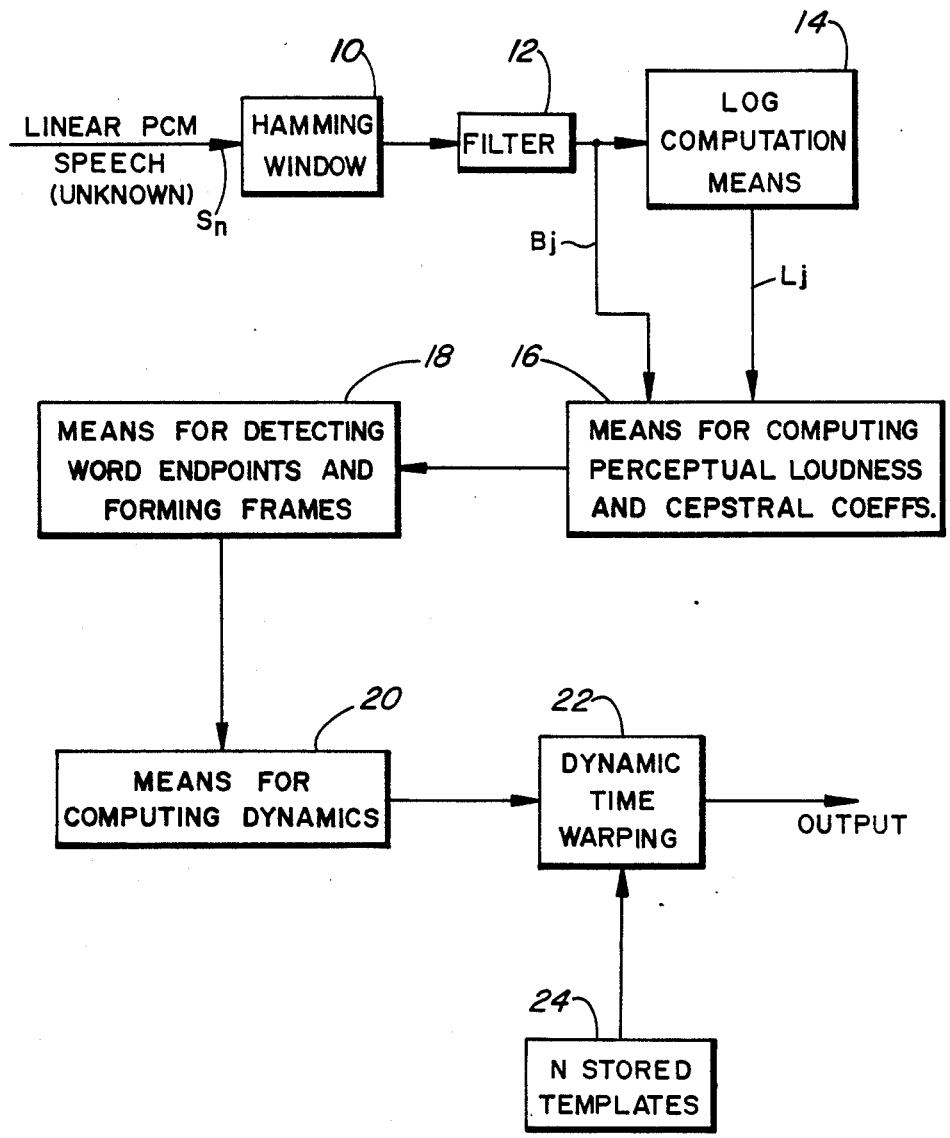

United States Patent [19]

Lennig et al.

[11] Patent Number: 4,956,865
[45] Date of Patent: Sep. 11, 1990

[54] SPEECH RECOGNITION

[75] Inventors: Matthew Lennig; Paul Mermelstein, both of Montreal; Vishwa N. Gupta, Brossard, all of Canada

[73] Assignee: Northern Telecom Limited, Montreal, Canada

[21] Appl. No.: 191,824

[22] Filed: May 2, 1988

Related U.S. Application Data

[63] Continuation of Ser. No. 697,109, Feb. 1, 1985, abandoned.

[51] Int. Cl.⁵ ............................ G10L 7/08; G10L 9/02
[52] U.S. Cl. ........................................ 381/43; 381/45; 381/50
[58] Field of Search ..................................... 381/36–50

[56] References Cited

U.S. PATENT DOCUMENTS

| | | | |
|---|---|---|---|
| 3,582,559 | 6/1971 | Hitchcock et al. | 381/43 |
| 4,058,676 | 11/1977 | Wilkes et al. | 381/37 |
| 4,394,538 | 7/1983 | Warren et al. | 381/43 |
| 4,590,605 | 5/1986 | Hataoka et al. | 381/43 |
| 4,601,054 | 7/1986 | Watari et al. | 381/43 |
| 4,624,011 | 11/1986 | Watanabe et al. | 381/43 |

OTHER PUBLICATIONS

Kjell Elenius and Mats Blomberg, "Effects of Emphasizing Transitional or Stationary Parts of the Speech Signal in a Discrete Utterance Recognition System", IEEE Proceedings of the ICASSP, 1982, pp. 535–538.
Davis and Mermelstein, "Comparison of Parametric Representations for Monosyllabic Word Recognition in Continuously Spoken Sentences", IEEE Transactions on ASSP, vol. ASSP-28, No. 4, Aug. 1980, pp. 357–366.
Lamel et al, "An Improved Endpoint Detector for Isolated Word Recognition", IEEE Transactions on ASSP, vol. ASSP-29, No. 4, Aug. 1981, pp. 777–785.

*Primary Examiner*—Gary V. Harkcom
*Assistant Examiner*—David D. Knepper
*Attorney, Agent, or Firm*—Foley & Lardner, Schwartz, Jeffery, Schwaab, Mack, Blumenthal & Evans

[57] ABSTRACT

In a speech recognizer, for recognizing unknown utterances in isolated-word speech or continuous speech, improved recognition accuracy is obtained by augmenting the usual spectral representation of the unknown utterance with a dynamic component. A corresponding dynamic component is provided in the templates with which the spectral representation of the utterance is compared. In preferred embodiments, the representation is mel-based cepstral and the dynamic components comprise vector differences between pairs of primary cepstra. Preferably the time interval between each pair is about 50 milliseconds. It is also preferable to compute a dynamic perceptual loudness component along with the dynamic parameters.

10 Claims, 2 Drawing Sheets

SPEECH RECOGNITION

This application is a continuation, of application Ser. No. 697,109, filed Feb. 1, 1985, now abandoned.

The invention relates to speech recognition

In known speech recognizers the speech, coded in pulse code modulation (PCM) format, is pre-processed to render that it in a form that is more closely related to the way that the human auditory system perceives speech. For example, the speech may be processed to give filter bank energies, cepstra, mel-frequency cepstra, or linear prediction coefficients. Recognition units, for example, words, or syllables, are then compared with each of a series of reference templates representing valid units. The template that is the closest match is deemed to be the unknown unit and the label of the unit corresponding to the template is provided at the output.

Although such recognizers are adequate for certain applications, they are not entirely satisfactory because they give an error rate that is unacceptable in some applications, especially speaker-independent, telephone-based, or large vocabulary applications. This is thought to be because the usual representation does not model sufficiently the response of the human auditory system.

According to the present invention, apparatus for recognizing speech comprises:

(i) means for representing an unknown speech utterance as a sequence of parameter frames, each parameter frame representing a corresponding time frame of said utterance;

(ii) means for providing a plurality of reference templates, each comprising a sequence of parameter frames expressed in the same kind of parameters as the first-mentioned parameter frames each parameter frame of the first-mentioned (unknown) sequence and second-mentioned (reference) sequence comprising a set of primary parameters and a set of secondary parameters, each secondary parameter representing the signed difference between corresponding primary parameters in respective parameter frames derived for different time frames; and (iii) means for comparing the sequence of parameter frames of the unknown utterance with each reference template and determining which of the reference templates most nearly resembles Each parameter frame comprises a set of parameters selected according to the type of representation employed, for example filter bank energies, cepstra, mel-based cepstra or linear prediction coefficients.

Preferably, the time difference between centres of said different time frames is from 20 mS to 200 mS, preferably about 50 mS. Conveniently, the secondary parameter is derived from preceding and succeeding primary parameters, for example ±25 milliseconds or ±two frames.

It is also preferable to include a component representing change in amplitude or change in perceptual loudness as a secondary parameter for both the unknown utterance and the reference templates. Such a loudness component is not usually used in the primary parameters since absolute amplitude or absolute loudness is not effective in distinguishing words.

Generally, then, the innovation consists of augmenting the set of primary short-time static parameters normally used for speech recognition with a set of dynamic secondary parameters representing change in each of the primary parameters over a short time interval (for example, 20 to 200 mS). Use of dynamic parameters in addition to primary parameters renders the distance measure or probability density function used to distinguish speech sounds more sensitive to important phonemic differences as opposed to other, irrelevant, acoustic differences.

Any kind of short-tim spectral representation may be used as the set of primary parameters. Examples of such representations include filter bank energies, the cepstrum, the mel-frequency cepstrum, linear prediction coefficients, etc. Each of these representations estimates the magnitude or power spectrum over a time frame (typically between 2 and 50 mS) in terms of a small number of parameters (typically between 3 and 80).

If $P_t$ is the vector of primary parameters computed $$20 mS \leq a+b \leq 200\ mS$$

the dynamic parameter vector $\Delta P_{6\,t}$ is defined to be the vector difference $$\Delta P_t = P_{t+a} - P_{t-31\,b}$$

The invention consists of using the ensemble of parameters $P_t$ together with $\Delta P_t$ to represent the speech signal in the neighbourhood of time t. Probability density functions and distances are then defined in terms of this augmented parameter set consisting of both static (primary) and dynamic (secondary) parameters.

Alternatively, the above derivation may be expressed in terms of frame numbers. If $\Delta t$ = the time difference between adjacent frames and if $P_i$ = the primary parameter vector at frame i, then the dynamic parameter vector $\Delta P_i$ is defined as the vector difference $$\Delta P_i = P_{i+\left\lfloor \frac{a}{\Delta t} \right\rfloor} - P_{i-\left\lfloor \frac{b}{\Delta t} \right\rfloor}$$

Figure 2A:
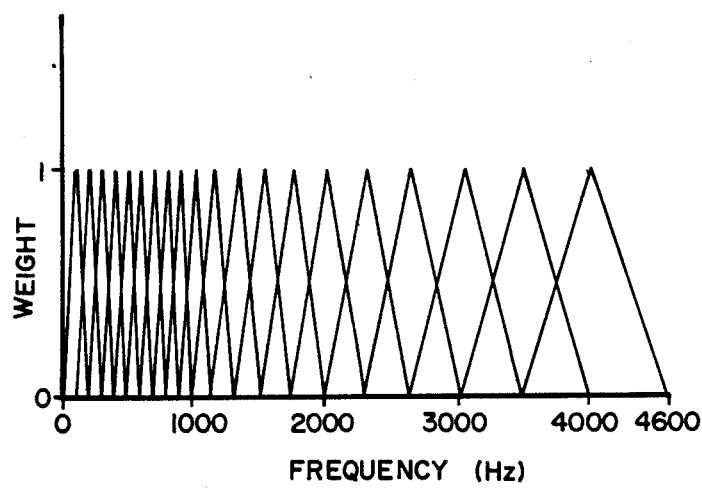
Figure 2B:
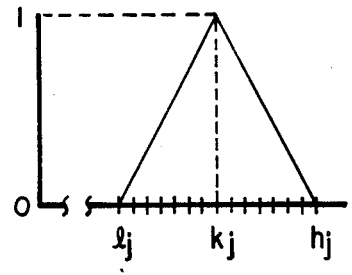

Preferably the parameters are mel-based cepstral coefficients in which case the primary coefficients $C_1, \ldots, C_n$ represent the spectral shape and the secondary parameters $\Delta C_1, \ldots, \Delta C_m$ represent change in spectral shape during the specified time interval. In addition, $\Delta C_O$ may be included in the se of secondary parameters to represent change in loudness or amplitude. An embodiment of the invention will now be described by way of example only and with reference to the accompanying drawings, in which:

FIG. 1 is a generalized block diagram of a speech recognizer; and FIGS. 2a and 2b is a diagram representing the characteristics of a filter means of the speech recognizer.

In the speech recognition system illustrated in FIG. 1, signal $S_n$ represents a linear pulse-code-modulated (PCM) speech signal, which is the unknown or "input" utterance to be recognized. Signal $S_n$ is applied to window means 10. In the window means 10, the signal $S_n$ is divided into time frames, each of 25.6 milliseconds or 204 samples duration. In operation, each frame is advanced by 12.8 milliseconds or 102 samples so that successive frames overlap by 50 per cent. Each time frame is then multiplied point-by-point by a raised cosine function and applied to filter means 12. This Hamming window attenuates spectral sidelobes.

A 256 point Fast Fourier Transform is performed on each time frame and results in a 128 point real power spectrum, $F_1, \ldots, F_N$, where $N=128$.

The filter means 12 effectively comprises a filter bank of twenty triangular filters, which determine the energy in a corresponding set of twenty channels spanning the range from about 100 Hz to about 4000 Hz for a PCM sampling rate $f_s$ of 8 KHz. As illustrated in FIG. 2a, the channels are mel-spaced, with channel centre frequencies spaced linearly from 100 Hz to 1000 Hz at 100 Hz intervals and logarithmically from 1100 Hz to 4000 Hz.

For each time frame the output of each filter channel is a weighted $B_j$ derived in accordance with the expression:

$$B_j = \sum_{i=1}^{N} W_{ij} F_i$$

where $B_j$ is the jth mel-frequency channel energy output, $F_i$ are the N spectral magnitudes $1 \leq i \leq N$ from the Fast Fourier Transform, and the $W_{ij}$ are weights defined as:

$$W_{ij} = \begin{cases} 0, & i\Delta f \leq l_j \\ (i\Delta f - l_j)/(k_i - l_j), & l_j \leq i\Delta f \leq k_j \\ (h_j - i\Delta f)/(h_j - k_j), & k_j \leq i\Delta f \leq h_j \\ 0, & i\Delta f \geq h_j \end{cases}$$

for $1 \leq N$ and $1 \leq j \leq 20$
where $$\Delta f = \frac{f_s}{2N}$$

and where $l_j$, $k_j$, $h_j$ for $1 \leq j \leq 20$ are the low, center, and high frequencies, respectively of each filter channel, given in Table 1.

The twenty log channel energies of the signal $B_j$ are computed in means 14 according to the expression:

$$L_j = \log_{10} j \text{ for } 1 \leq j \leq 20.$$

The outputs of the filter means and the means 14 are applied to means 16 for computing, respectively, perceptual loudness $C_O$, and the first seven mel-based cepstral coefficients $C_1, C_2, \ldots C_7$.

The perceptual loudness $C_O$ is the log of a perceptually weighted sum of the channel energies $B_j$ obtained thus:

$$C_0 = 600 \log_{10} \sum_{j=1}^{20} v_j B_j$$

where $v_j \geq 0$ are chosen to correspond to perceptual importance. Suitable values for $v_j$ are illustrated in Table 1 below.

TABLE 1

| FILTER NO.(j) | low $l_j$ Hz | center $k_j$ Hz | high $h_j$ Hz | LOUDNESS WEIGHT $v_j$ |
|---|---|---|---|---|
| 1, | 0., | 100., | 200. | .0016 |
| 2, | 100., | 200., | 300. | .0256 |
| 3, | 200., | 300., | 400. | .1296 |
| 4, | 300., | 400., | 500. | .4096 |
| 5, | 400., | 500., | 600. | 1. |
| 6, | 500., | 600., | 700. | 1. |

TABLE 1-continued

| FILTER NO.(j) | low $l_j$ Hz | center $k_j$ Hz | high $h_j$ Hz | LOUDNESS WEIGHT $v_j$ |
|---|---|---|---|---|
| 7, | 600., | 700., | 800. | 1. |
| 8, | 700., | 800., | 900. | 1. |
| 9, | 800., | 900., | 1000. | 1. |
| 10, | 900., | 1000., | 1150. | 1. |
| 11, | 1000., | 1150., | 1320. | 1. |
| 12, | 1150., | 1320., | 1520. | 1. |
| 13, | 1320., | 1520., | 1750. | 1. |
| 14, | 1520., | 1750., | 2000. | 1. |
| 15, | 1705., | 2000., | 2300. | 1. |
| 16, | 2000., | 2300., | 2640. | 1. |
| 17, | 2300., | 2640., | 3040. | 1. |
| 18, | 2640., | 3040., | 3500. | 1. |
| 19, | 3040., | 3500., | 4000. | 1. |
| 20, | 3500., | 4000., | 4600. | 1. |

The means 16 for obtaining the cepstral coefficients $C_i$ functions by taking the cosine transform of the log energies, thus:

$$C_i = \sum_{j=1}^{20} L_j \cos\left[\frac{i(j - \frac{1}{2})\pi}{20}\right]$$

where $1 \leq i \leq 7$.

For further information on computing the coefficients, the reader is directed to a paper by S. B. Davis and P. Mermelstein entitled "Comparison of Parametric Representations for Monosyllabic Word Recognition in Continuously Spoken Sentences", IEEE Transactions on Acoustics, Speech and Signal Processing, Vol. ASSP 28 No. 4 pp. 357-366 August 1980.

The output of means 16, which comprises the set of primary parameters $C_1, \ldots, C_7$ and the perceptually weighted loudness parameter $C_O$, is passed, every 12.8 milliseconds, to utterance endpoint detector 18. The word endpoints are detected by searching for minima of sufficient duration and depth in the perceptual loudness $C_O$ as a function of time frame number. Endpoint detection may be by one of various known methods, for example a disclosed in "An Improved Endpoint Detector for Isolated Word Recognition", L. F. Lamel, L. R. Rabiner, A. E. Rosenberg and J. G. Wilpon, IEEE Trans. on Acoustics, Speech and Signal Processing, Vol. ASSP-29, No. 4, August 1981, p.777-785.

Thereafter the interword intervals or silences are removed, i.e., only the intervening utterance is transmitted. Optionally the number of parameter frames per utterance M may be standardized, for example at $M=32$, by linearly spaced frame deletion or repetition.

The output of the endpoint detector 18 is a sequence of M mel-based cepstra, and is represented by the matrix:

$$U = \begin{matrix} c_{1,0} & \cdots & c_{1,7} \\ \vdots & & \vdots \\ c_{M,0} & \cdots & c_{M,7} \end{matrix}$$

This output signal, or recognition unit representation, U, is applied to dynamic parameter computing means which computes the dynamic parameters as:

$$\Delta C_{i,j} = C_{i+c,j} - C_{i-d,j}$$

for $d+1 \leq i \leq M-c$, $0 \leq j \leq 7$,
where c is the leading frame separation, d is the lagging frame separation. In the specific case, $c=d=2$.

For $1 \leq < d+1$ $$\Delta C_{i,j} = C_{i+c,j} - C_{1,j} \text{ and}$$
For $M-c < \leq M$
$$\Delta C_{i,j} = C_{M,j} - C_{i-d,j}$$

These dynamic parameters take account of the human auditory system's propensity for perceiving change in the incoming stimulus.

The sequence of M parameter frames U' comprising primary (static) and secondary (dynamic) parameters, represented by the matrix:

$$U' = \begin{matrix} C_{1,1}, & \ldots, & C_{1,7}, & \Delta C_{1,0}, & \ldots, & \Delta C_{1,7} \\ \cdot & & \cdot & \cdot & & \cdot \\ \cdot & & \cdot & \cdot & & \cdot \\ C_{M,1}, & \ldots, & C_{M,7}, & \Delta C_{M,0}, & \ldots, & \Delta C_{M,7} \end{matrix}$$

is applied from dynamics computing means 20 to dynamic time warping means 22.

It should be noted that the $C_O$ vectors relating to static loudness are not used.

A corresponding set of templates, including dynamic parameters and a dynamic loudness component $\Delta T_{,0}$ is derived by means 24 of the form:

$$T = \begin{matrix} T_{1,1}, & \ldots, & T_{1,7}, & \Delta T_{1,0}, & \ldots, & \Delta T_{1,7} \\ \cdot & & \cdot & \cdot & & \cdot \\ \cdot & & \cdot & \cdot & & \cdot \\ T_{32,1}, & \ldots, & T_{32,7}, & \Delta T_{32,0}, & \ldots, & \Delta T_{32,7} \end{matrix}$$

The sequence of parameters for the templates is also applied to dynamic time warping means 22.

The "unknown"parametric representation U' is compare with each of the reference templates T' in turn and the time warp distance computed in each case. The unknown utterance is deemed t be the reference utterance corresponding to the template having the minimum war distance.

The dynamic time warp computation may be as described by Hunt, Lennig and Mermelstein in a chapter entitled "Use of Dynamic Programming in a Syllable-Based Continuous Speech Recognition System"in Time Warps, String Edits, and Macromolecules: The Theory and Practice of Sequence Comparison, D. Sankoff and J. B. Kruskal, eds. Addison-Wesley (Reading MA), pp. 163-187, 1983.

It has been found that a significant improvement in recognition accuracy is obtained by including dynamic parameters in the parametric representation. It has also been found that particularly good results are obtained when the dynamic parameters represent the change in the speech signal between time frames spaced by about 50 milliseconds.

Although described as applied to isolated word recognizers, the invention is also applicable to connected word recognizers and is also useful whether the recognizer is speaker-trained or speaker-independent.

Experimental results using the parameter set augmented with dynamic parameters as described above, in which the primary parameters were the first seven mel-frequency cepstral coefficients, resulted in about 20% reduction in recognition errors in speaker-independent connected digit recognition over the public switched telephone network. In addition to using dynamic parameters corresponding to the first seven mel-based cepstral coefficients, the eighth dynamic parameter corresponding to change in overall loudness further reduced errors by about 10%.

What is claimed is:

1. A method of recognizing an unknown speech utterance comprising the steps of:
   (i) representing said unknown speech utterance as a first sequence of parameter frames, each parameter frame representing a corresponding time frame of said utterance;
   (ii) providing a plurality of reference templates, each comprising a second sequence of parameter frames expressed in the same kind of parameters as the first sequence of parameter frames;
   each parameter frame of the first sequence and second sequence of parameter frames comprising a set of primary parameters and a set of secondary parameters, each of the secondary parameters representing the signed difference between corresponding primary parameters in respective parameter frames derived for different time frames;
   (iii) computing a dynamic loudness component $\Delta C_{i,o}$ from said unknown speech utterance as a secondary parameter, and providing a corresponding dynamic loudness component $\Delta T_{,o}$ in each of said secondary parameter frames, said dynamic loudness components being a signed rate of change in overall amplitude between frames;
   (iv) comparing each of the primary and secondary parameters in the sequence of parameter frames of the unknown utterance with each reference template and determining which of the reference templates most closely resembles the unknown utterance.

2. A method as defined in claim 1, wherein the time between the centers of adjacent time frames is in the range of 20 to 200 milliseconds.

3. A method as defined in claim 2, wherein said time is about 50 milliseconds.

4. A method as defined in claim 1, wherein the secondary parameters are computed in accordance with the expression:
$$\Delta C_{i,j} = C_{i+c,j} - C_{i-d,j}$$

for $d+1 \leq i \leq M-c, \leq j \leq 7$ where i,j are the respective time and coefficient indices of a matrix for the values of the secondary parameters $\Delta C$, M is the maximum number of the time index i, c is the leading frame separation and d is the lagging frame separation, both relative to the frame for which the dynamic parameter is being determined.

5. A method as defined in claim 4, wherein the secondary parameters are computed in accordance with the expression:

$$\Delta C_{i,j} = _{i+c,j} - C_{1,j}$$

for $1 \leq i < d+1$ and in accordance with the expression:

$$C_{i,j} = C_{M,j} - C_{i-31\ d,j}$$

for $M-c < i \leq M$

6. Apparatus for recognizing an unknown speech utterance in a speech signal comprising:
   (i) means for representing an unknown speech utterance as a first sequence of parameter frames, each parameter frame representing a corresponding time frame of said utterance;
   (ii) means for providing a plurality of parameter frames expressed in the same kind of parameters as the first sequence of parameter frames;
   each parameter frame of the first sequence and second sequence of parameter frames comprising a set of primary parameters and a set of secondary parameters, each of the secondary parameters representing the signed difference between corresponding primary parameters in respective parameter frames derived from different time frames:
   (iii) means responsive to said unknown speech utterance for computing a dynamic loudness component $\Delta C_{i,0}$ for said first sequence of parameter frames and means for providing a dynamic loudness component $\Delta T_{l,0}$ for said second sequence of parameter frames, each component being one of the secondary parameters said dynamic loudness components being a signed rate of change in overall amplitude between frames;
   (iv) means for comparing each of the primary and secondary parameters in the sequence of parameter frames of the utterance with each reference template and for determining which of the reference templates most nearly resembles the unknown utterance.

7. Apparatus as defined in claim 6, wherein said means for providing provides each said secondary parameter to represent the signed difference between primary parameters in respective parameter frames derived for time frames that are spaced by a time interval in the range of 20 to 200 milliseconds.

8. Apparatus as defined in claim 7, wherein the time frames are spaced by about 50 milliseconds center to center.

9. Apparatus as defined in claim 6, wherein the means for providing includes means for computing the secondary parameters $\Delta C_{i,j}$ in accordance with the expression:

$$\Delta C_{i,j} = C_{i+c,j} - C_{i-d,j}$$

for $d+1 \leq i \leq M31, \leq j \leq 7$ where i,j are the respective time and coefficient indices of a matrix for the values of the secondary parameters $\Delta C$, M is the maximum value of the time coordinate i, c is the leading frame separation and d is the lagging frame separation, both relative to the frame for which the dynamic parameter is being determined.

10. Apparatus as defined in claim 9, wherein said means for computing the secondary parameters does so in accordance with the expression:

$$\Delta C_{i,j} = C_{i+c,j} - C_{1,j}$$

for $1 \leq i < d+1$ and in accordance with the expression:

$$\Delta C_{i,j} = C_{M,j} C_{i-d,j}$$

for $M-c < i \leq M$

* * * * *